United States Patent [19]

Mizuno et al.

[11] Patent Number: 4,674,352
[45] Date of Patent: Jun. 23, 1987

[54] STEERING WHEEL DEVICE

[75] Inventors: Shigeo Mizuno; Kazuhisa Kubota; Takafumi Ichikawa, all of Aichi, Japan

[73] Assignee: Kabushiki Kaisha Tokai Rika Denki Seisakusho, Japan

[21] Appl. No.: 687,272

[22] Filed: Dec. 28, 1984

[30] Foreign Application Priority Data

| Dec. 29, 1983 | [JP] | Japan | 58-204071[U] |
| Dec. 29, 1983 | [JP] | Japan | 58-204072[U] |
| Dec. 29, 1983 | [JP] | Japan | 58-204073[U] |
| Dec. 29, 1983 | [JP] | Japan | 58-204074[U] |
| Dec. 29, 1983 | [JP] | Japan | 58-204075[U] |
| Dec. 29, 1983 | [JP] | Japan | 58-204076[U] |

[51] Int. Cl.$^4$ .................. B62D 1/10; H01R 39/08
[52] U.S. Cl. ......................... 74/484 R; 29/259; 74/492; 74/552; 200/61.54; 339/3 S
[58] Field of Search .............. 74/484 R, 492, 552; 200/61.54; 339/3 S; 29/259

[56] References Cited

U.S. PATENT DOCUMENTS

| 1,522,983 | 1/1925 | Strassner | 29/259 |
| 2,860,407 | 11/1958 | Grunder et al. | 29/258 |
| 4,368,454 | 1/1983 | Pilatzki | 74/484 R |
| 4,421,960 | 12/1983 | Arima et al. | 200/61.54 |
| 4,485,371 | 11/1984 | Yamada et al. | 74/552 |
| 4,598,602 | 7/1986 | Kurata et al. | 74/484 R |

FOREIGN PATENT DOCUMENTS

| 3,402,164 | 1/1984 | Fed. Rep. of Germany | 74/552 |
| 57-95232 | 6/1982 | Japan | 200/61.54 |
| 58-224854 | 12/1983 | Japan | 74/484 R |

Primary Examiner—Allan D. Herrmann
Attorney, Agent, or Firm—Lowe, Price, LeBlanc, Becker & Shur

[57] ABSTRACT

A steering wheel apparatus is disclosed. It has a steering shaft and a boss fitted onto the steering shaft. A base is mounted on the rear portion of the boss in such a manner as to be fixed with respect to the axial direction but free with respect to the rotary direction of the steering shaft. A locking disc is rotatably mounted on the outer periphery of the base. A pin holder having a plurality of through holes is mounted on the front portion of the boss. The same number of slide pins are arranged in such a manner as to penetrate through the corresponding through holes in the pin holder for engaging with the stopper. A steering wheel is mounted on the boss through a boss plate. The steering wheel is prevented from being locked.

12 Claims, 18 Drawing Figures

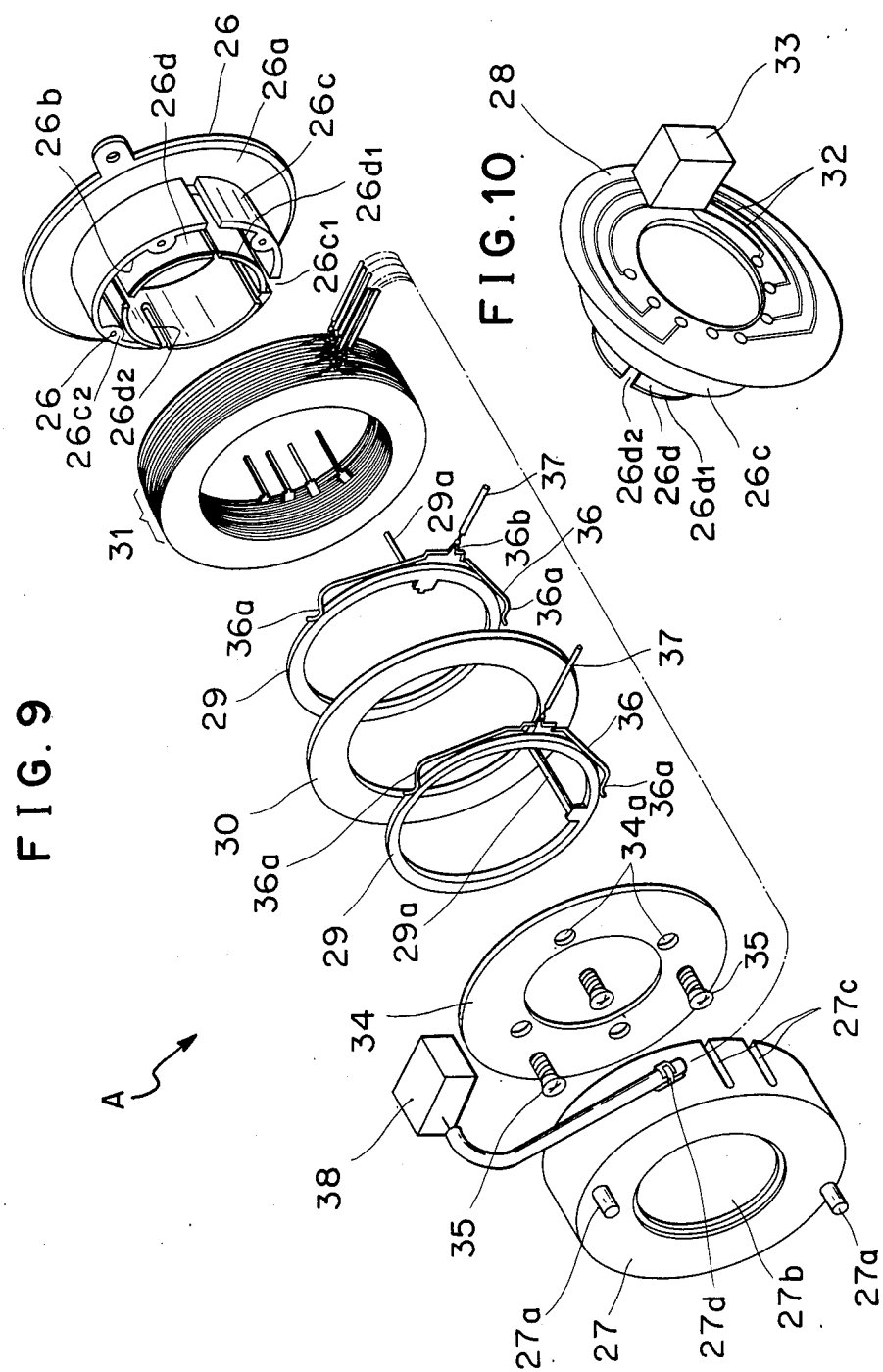

STEERING WHEEL DEVICE

BACKGROUND OF THE INVENTION

This invention relates to an improvement of a steering wheel apparatus, and more particularly to an apparatus of the type having a power transmission mechanism for associating a steering column side to a steering pad including switches such as button switches displayed as to keep the steering pad in a stationary state even when the steering wheel is rotated so that difficulties in operating switches and seeing the display due to the rotation of the steering pad which rotate together with the steering wheel can be prevented.

Heretofore, there is known a steering wheel apparatus having a power transmission mechanism of this type as shown in FIGS. 1 and 2.

In the drawings, a steering shaft 1 is provided with a boss 3 which is fixedly attached to a boss plate 2a of a steering wheel 2. Boss 3 is fastened to the steering shaft 1 by a nut 4. A pad base 7 of a steering pad 6 having push button switches 5 and display thereon is rotatably fitted on the boss 3 and a C-ring 8 is provided in order to prevent the pad base 7 from coming off.

At more than two places in the steering column side, fixing pins 9 having slant surfaces 9a at the foremost end portions are reciprocally received by pin holders 10. A spring 11 is stretched between each of the fixing pins 9 and each of the pin holders 10, so that the fixing pin 9 is biased toward the pad base 7.

The pad base 7 is formed with a recess 7a in the position opposite to the pin holder 10. The foremost end portion of the fixing pin 9 is fitted in said recess 7a. Because of said fitting, rotation of the steering pad 6 is prevented.

The boss plate 2a is designed to be rotated transverse to the fixing pin 9. The boss plate 2a is formed with a slant surface 2b at the portion which contacts the fixing pin 9, so that when the boss plate 2a hits the fixing pin 9, the fixing pin 9 can be easily pushed into the pin holder 10 through the slant surface 9a thereof.

Because of the above arrangement, when the fixing pin 9 is pushed into the pin holder 10 by the boss plate 2a, the steering wheel 2 becomes rotatable through that portion. However, since at least one end of the fixing pins 9 are fitted in the recesses 7a of the pad base 7 at other portions, the steering pad 6 is normally kept stationary in a predetermined position, even when the steering wheel 2 rotates.

However, in a steering wheel apparatus of the above type, since the respective parts of the apparatus are required to be mounted on the steering shaft in order, the mounting efficiency is poor. Also, a constant attention is required from the initial stage of the mounting operation in order to place the steering pad 6 in the right position.

Furthermore, since it is usual practice that a lever combination switch is placed in a position far inside than the steering wheel 2, when the lever combination switch becomes out of order, the whole steering wheel apparatus is required to be dismantled for repairing, and much time and labor are required for it.

Another problem in said conventional apparatus is in a connecting device between the switches 5 and display on the steering pad 6, and the corresponding circuits at the vehicle body side, since the rotary boss plate 2a is interposed therebetween. In other words, a conductive material formed of slip ring and stationary connecting element are required for the purpose of passing the current through the boss plate 2a. However, in order to replace or repair the conductive material, it is required to dismantle the power transmission mechanism for maintaining the steering pad in a stationary state even when the steering wheel is rotated and it is much time and labor consuming.

Furthermore, a serious attention should be invited to the fact that when the fixing pins 9 happen to be locked, the steering wheel 2 becomes unrotatable which results in a serious accident. When the steering wheel 2 rotates with excessive force as to destroy fixing pins 9, electric wires extending from the vehicle body side are frequently wound around the steering shaft 1 which causes the wires to be cut. Wire repair is often extremely difficult.

Although the steering pad 6 does not rotate and is kept stationary as mentioned above, everytime the boss plates 2a transverse the fixing pin 9 during the rotation of the steering wheel 2, the fixing pin 9 is urged to hit the pad base 7 due to the biasing force of the spring 11. Therefore, such inconveniences as that hitting impact is transmitted to the driver, hitting sound is generated and that an unpleasant feeling is created since the rotary loads of the steering wheel 2 are increased every time the slant 2b of the boss plate 2a hits the slant surface 9a of the fixing pin 9, thereby jeopardizing smooth operation of the steering wheel.

SUMMARY OF THE INVENTION

It is therefore an object of the present invention to provide a steering wheel apparatus wherein substantially all components of the steering wheel apparatus including a steering wheel are mounted on a boss so that the mounting of the steering wheel and the steering wheel apparatus are completed only by fitting the boss onto a steering shaft.

Another object of the invention is a provision of a steering wheel apparatus wherein the whole components of the steering wheel apparatus including the steering wheel can be removed easily so that a trouble of a lever combination switch can be repaired rapidly.

A further object of the invention is a provision of a steering wheel apparatus wherein a power transmitting mechanism for holding the steering pad in a stationary state including the steering pad itself is made to be rotatable when the rotation of the steering wheel is prevented without causing such trouble as to wind electric wires leading to circuits at the vehicle body side so that the rotation of the steering wheel is always ensured even at the time of emergency thereby preventing an accident to occur in advance.

A still further object of the invention is to provide a steering wheel apparatus wherein the conductive material can be replaced easily without dismantling the power transmitting mechanism for normally holding the steering pad in a stationary state even when the steering wheel is rotated.

A still further object of the present invention is a provision of a steering wheel apparatus which obviates dismantling of the power transmitting mechanism so that accuracy and reliability thereof will not be decreased.

A still further object of the invention is to provide a steering wheel apparatus wherein coupling recesses and coupling pins are provided for coupling each other by elastic means so that the power transmitting mechanism and the members at the vehicle body side can be constructed separately, enabling mounting of the power transmitting mechanism with less care compared with the above prior art apparatus.

A still further object of the present invention is a provision of a steering wheel apparatus wherein the coupling recesses and coupling pins are designed such that when they are out of engagement, the power transmitting mechanism is free to rotate and when they are brought in alignment, the coupling pins are automatically coupled with the coupling recesses so that breakage and problems with the power transmitting mechanism can be prevented in advance.

A still further object of the invention is to provide a steering wheel apparatus wherein a means is provided to remove the boss from the steering shaft with ease.

In order to obtain the above objects and others, there is essentially provided a steering wheel apparatus comprising a steering column fixed to a car body; a steering shaft supported by said steering column for axial rotation thereabout; a steering wheel having an elongated boss fixed to said steering shaft; a base rotatably supported by said elongated boss, said base being adapted for engagement with the steering column; a pad base rotatably supported by said elongated boss, said pad base being adapted to maintain an orientation thereof with respect to the steering column independently of steering shaft rotation when the steering wheel is operated; and a steering pad attached to said pad base; said base and said pad base being unitized on the boss of said steering wheel.

BRIEF DESCRIPTION OF THE INVENTION

FIG. 3 through FIG. 10 illustrate a first embodiment of the present invention wherein;

FIG. 3 is a vertical sectional view of a steering wheel apparatus;

FIG. 4 is a front view of a cam plate portion;

FIG. 5 is likewise a front view of a base and locking disc;

FIG. 6 is a side view of the cam plate and a slide pin illustrating the contacting state therebetween;

FIG. 7 is a sectional view of the above but showing only a portion which is material to the present invention;

FIG. 8 is a sectional view of a jig for removal when in use;

FIG. 9 and FIG. 10 illustrate a slip ring wherein FIG. 9 is an exploded perspective view thereof and FIG. 10 is a perspective view of the foregoing when viewed from a printed circuit board side;

DETAILED DESCRIPTION OF THE EMBODIMENTS

Figure 1:
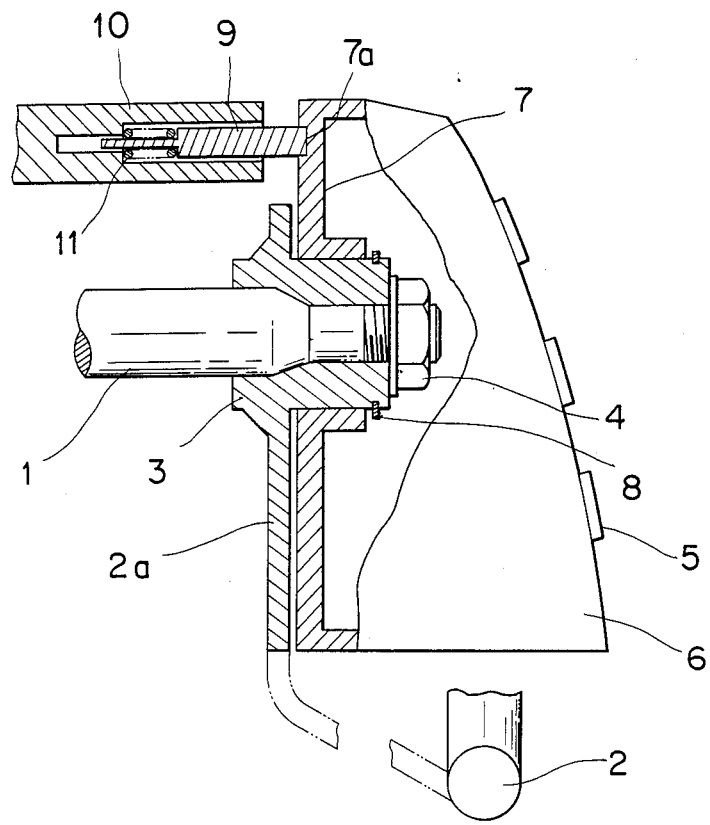
FIG. 1 is a vertical view of a conventional steering wheel apparatus.

Preferred embodiments of the present invention will now be described with reference to the accompanying drawings, wherein like numerals denote the like or corresponding parts throughout the several sheets.

Referring first to FIG. 3 through FIG. 8, a first preferred embodiment of the present invention will be described.

A base 12 is mounted on a front portion 3a of a base 3 in such a manner as to be fixed with respect to the axial direction but free with respect to the rotary direction by C-rings 13, 13'. A locking disc 14, is rotatably mounted on the outer periphery of said base 12.

Locking disc 14 is formed with recesses 14a, in each of which a leaf spring 15 having at the both ends folded portions 15a for engagement is rested, said folded portions 15a engaging with a V-shaped cut 12a of the base 12.

Also, said base 12 is formed with holder holes 12b in each of which a spring 16 and a coupling pin 17 are contained. Said coupling pin 17 is biased in the backward direction by the spring 16 and rested at the tip portion in a coupling recess 18s of a steering column body 18 which is fixed to a car body and contains a lever combination switch (not illustrated) therein. Since the steering column body 18 is not rotated, the base 12 also does not rotate even when the boss 3 rotates.

Since the base 12 is not rotated and held in a stationary state, the locking disc 14, which is engaged at the folded portions 15a of the leaf spring 15 with the V-shaped cuts 12a of the base 12, is not rotated either. However, when the locking disc 14 is forced to rotate, said folded portions 15a will be disengaged from the V-shaped cuts 12a by resisting the biasing force of the leaf spring 15. As a result, locking disc 14 becomes rotatable.

A pad base 19 mounted on the boss 3 in such a manner as to be fixed with respect to the axial direction but free in the rotary direction by a cam plate 21 which is secured to a rear portion 3b of the boss 3 by a nut 20. Said pad base 19 comprises a ring-shaped boss portion 19a and a thick portion 19c formed with through holes 19b for allowing a plurality of slide pins 22 to penetrate therethrough. A steering pad 6 equipped with switches, display and the like is mounted on pad base 19.

Locking disc 14 is formed with a plurality of coupling recesses 14a opposite said through holes 19b. The chamfered portions 22a at the tips of said slide pins 22 which are penetrated through the through holes 19b can be inserted in the recesses 14a.

Also, the slide pins 22 are provided at the other end portions with tapered ring-shaped grooves 22b Said cam plate 21 is formed with a cam face 21b which is tapered 21a at the outer end portion and formed of a synthetic resin material. Said cam face 21b is fitted by the ring-shaped grooves 22b. Said slide pins 22 are slided to and fro within the through holes 19b according to the configuration of the cam face 21b.

The cam face 21b is formed in such configuration as that at least one of the plurality of slide pins 22 are pushed in at the maximum extent and after the adjacent slide pins 22 are pushed in at the maximum extent, they are retreated backwardly. When the slide pins 22 are pushed in at the maximum extent, the tip portions thereof are inserted into the coupling recesses 14a of the locking disc 14. The tip portions of the slide pins 22 are provided with the chamfered portions 22a, so that the tip portions will not hit the marginal portions of the coupling recesses 14a when they enter.

Furthermore, since the outer end portion of the cam face 21b is tapered at 21a and the ring-shaped grooves 22b of the slide pins 22 are tapered as well, the contact between them for sliding the slide pins 22 does not constitute a point contact even at the slant portion of the cam face 21b, thus enabling smooth movement thereof. Moreover, since the cam face 21b is formed of a synthetic resin material, the sliding resistance between them is comparatively small. As a result, smooth movement of the slide pins 22 is obtained and extraordinary wear can be prevented.

The boss plate 2a of the steering wheel 2 is fixedly attached to the boss 3, and an inner projection 21c of the cam plate 21 is inserted into its key groove and fixedly secured by a nut 20. As a result, when the steering wheel 2 is rotated, the boss 3 is rotated to further rotate the cam plate 21.

However, since the tip portions of a part of the slide pins 22 are inserted into the coupling recesses 14a of the locking disc 14 as mentioned above, the pad base 19 is not rotated. On the other hand, since a part of the slide pins 22 are withdrawn into the through holes 19b, the boss plate 2a of the steering wheel can be rotated through the area.

A tapered portion 1a and a knurling tool portion 16 of the steering shaft 1 are meshed by the internal diameter of the boss 3, which is securely fastened to the steering shaft 1 by a nut 23. As a result, since the steering shaft 1 and the boss 3 are integrated, the rotation of the steering wheel 2 is transmitted to the steering shaft 1.

Within the steering column body 18 containing a lever combination switch, a cancel cam 25 is mounted on the steering shaft 1 with a spring 24 interposed therebetween. The cancel cam 25 is urged to engage with the boss 3 by the biasing force of the spring 24, so that when the steering wheel 2 rotates, the cancel cam 25 is actuated to extinguish a turn signal lamps.

In this way, since there are mounted on the boss 3 the base 12 supporting the locking disc 14, the pin holder 19 and the cam plate 21, these mechanisms for not rotating the steering pad 6, and the steering wheel 2 can be removed by loosening the nut 23.

Consequently, when assembled, after these mechanisms and the steering wheel 2 are mounted on the boss 3, the boss 3 is fitted onto the steering shaft 1. Then, the base 12 is rotated to bring the coupling pins 17 in registration with the coupling recesses 18a, and the pins 17 are urged to enter the recesses 18a for engagement by means of the force of the spring 16, so that the base 12 can be stopped rotating. Thereafter, the nut 23 is screwed tight to complete the assembly.

As seen in the above, these mechanisms can be conveniently mounted and removed by merely attaching and detaching the boss 3. Also, the same can be easily dismantled and repaired. In addition, the coupling between the coupling pins 17 and the coupling recesses 18a can be easily effected.

Furthermore, in order to facilitate an easy removal of the boss 3 which is bitten into the steering shaft 1 at the tapered portion 1a, the following removing jig may be employed.

Figure 8:
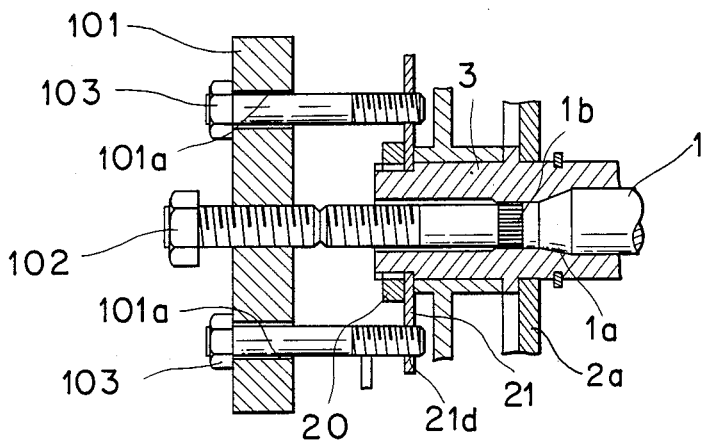

In FIG. 8, the removing jig comprises a jig body 101, a main screw 102 threadedly engaged with the center of the jig body 101, and fixing screws 103 for threading into holes 101a formed in the jig body 101. The cam plate 21 is provided with tapped holes 21d for threadedly engaging with said fixing screws 103.

In operation for removing the boss 3 from the steering shaft 1 by using said removing jig, the fixing screws 103 are threaded into the holes 101a of the jig body 101 for threadedly engaging with the tapped holes 21d of the cam plate 21, thereby fixing the jig body 101 to the cam plate 21.

As a result, the main screw 102 is brought into alignment with the steering shaft 1. As the main screw 102 is tightened, the jig body 101 is pushed away in the departing direction with respect to the steering shaft 1, and the cam plate 21 is moved in the removing direction with respect to the axial direction. Since the cam plate 21 is fixedly secured to the boss 3 with the nut 20, the boss 3 can thus be removed.

Furthermore, an inner bore 14b defined by the base 12 and the stopper 14, and an inner bore 19d defined by the pin holder 19 are formed, with the boss plate 2a interposed therebetween. Slip rings B and A as will be described hereinafter are accommodated in said bores 14b and 19d, respectively, through profections 27a.

Figure 3:
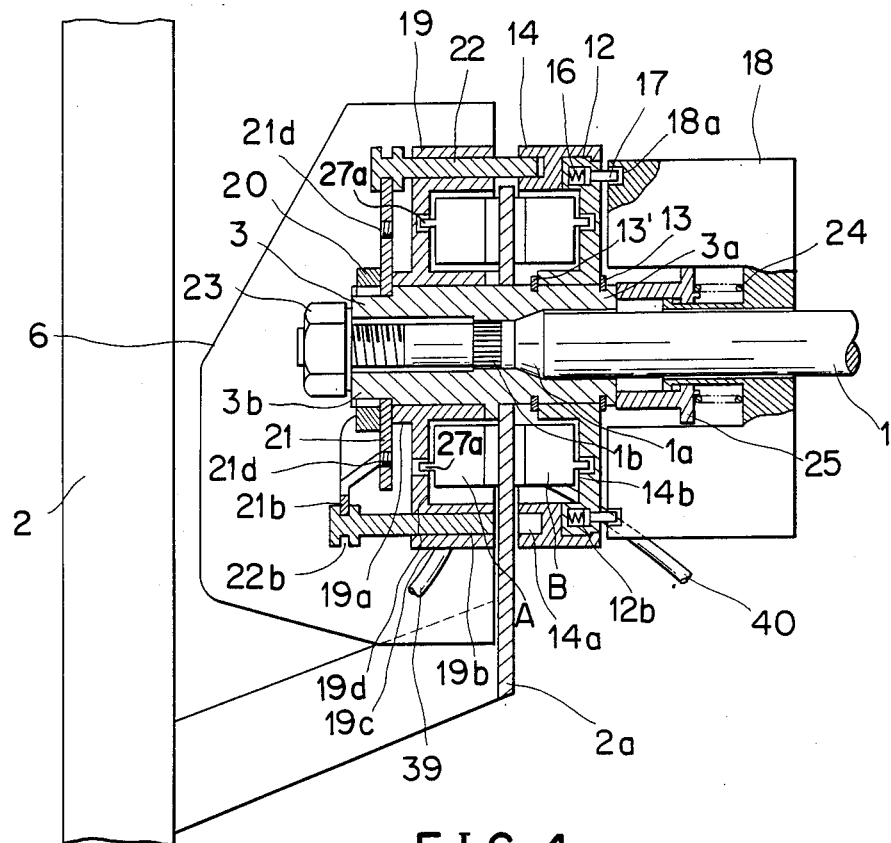
Figure 4:
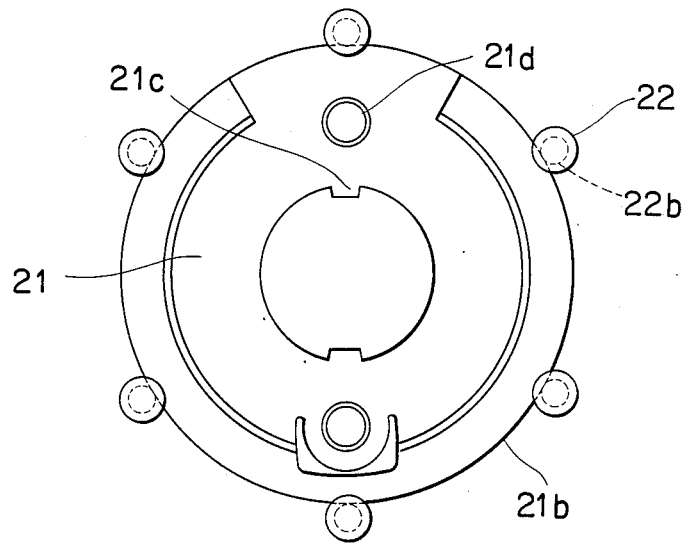
Figure 5:
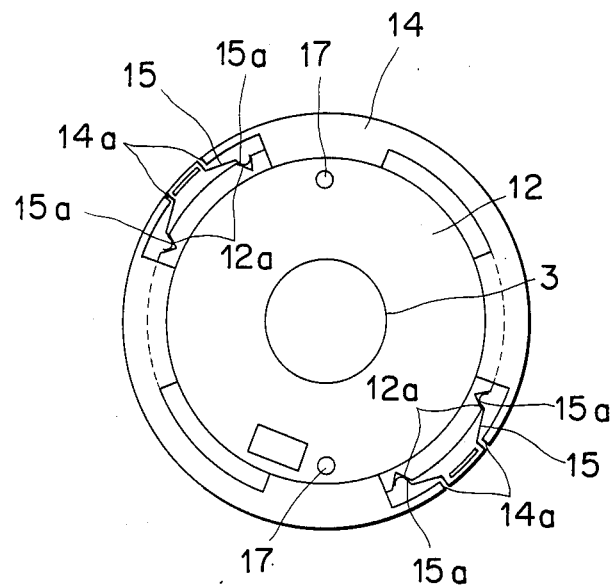
Figure 6:
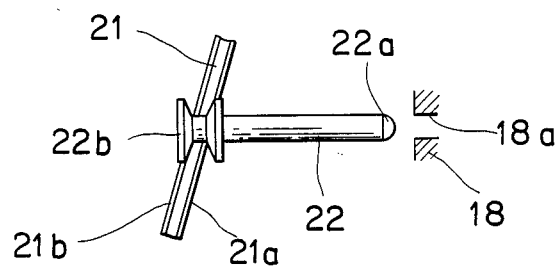
Figure 7:
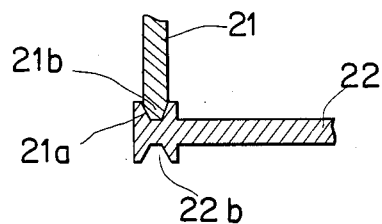

Referring now to FIGS. 3, 9 and 10, there will be described hereunder slip ring A accommodated in the inner bore 19d of the pad base 19, said slip ring being adapted to connect the switches and display of the steering pad 6 to the corresponding circuits on the vehicle body side.

A base portion 26 is provided at the front face of its flange base 26a with an outer circumferential wall 26c for defining a space 26d for containing a lead plate 29a of a fixed contact 29 as will be described hereinafter, and with an inner circumferential wall 26d formed with a pawl substantially fully around the circumference at the tip end portion thereof which is to be relatively, rotatably engaged with the inner periphery of a through hole 27b of a movable cover 27, said walls 26c and 26d being erected upright from the base portion 26. 26d2 denotes slits formed in the inner wall 26d for engaging with said pawl 26d1 by elastic means.

A printed circuit board 28 is formed at the rear face of the flange base 26a. A lead plate 29a of the fixed contact 29 leading out through the space 26d is soldered at the tip portion thereof with respect to the printed circuit board 28.

29 denotes fixed contacts formed in generally ring shapes and formed of conductive material. The contacts 29 and ring-shaped spacers 30 formed of insulated material such as plastic or the like are arranged in several layers alternatively in the axially elongated direction to form a current collecting body 31.

Each of fixed contacts 29 is provided at its inner circumference with a lead plate 29a folded in the direction toward the flange base 26a. The adjacent lead plates 29a are spacedly arranged at suitable angles in order not to be mutually short-circuited.

Said current collecting body 31 is accommodated outside of the outer circumferential wall 26c of the base portion 26.

26c1 denotes slits formed in the outer circumferential will 26c of said base portion 26 in such a manner as to correspond to the respective lead plates 29a of the fixed contacts 29. The arrangement being such that when said current collecting body 31 is mounted, the adjacent lead plates 29a of the fixed contacts 29 are inserted into the respective slits 26c1, thereby determining the right mounting position of said current collecting body 31 with respect to said outer circumferential wall 26c. That is, since the suitable mounting angles are determined in this way, the lead plates 29a will not be short-circuited.

The respective lead plates 29a of said fixed contacts 29 are led out through leading-out holes (not shown) formed in the flange base 26a of the space 26b and guided to the rear face of the printed circuit board 28, thereby being soldered and connected to a connector 33 through a lead 32.

34 denotes a fixing plate adapted to prevent the current collecting body 31 from escaping. Said fixing plate 34 is provided with through holes 34a for receiving screws therein, said through holes 34a being formed in the positions corresponding to tapped holes 26c3 of the ribs 26c2 formed in said outer circumferential wall 26c. Screws 35 are threaded into said through holes 34a and tapped holes 26c3 for mounting the plate 34 on said outer circumferential wall 26c, thereby preventing the current collecting body 31 from escaping.

A movable cover portion 27, or a case is put on the outer circumferential wall 26c of said base portion 26 of the fixing system in such a manner as to be relatively movable with respect to each other.

36 denotes movable contacts which elastically and slidingly contact with the respective fixed contacts 29. Each of said movable contacts 36 is formed of contacting portions 36a, 36b for contacting the fixed contact 29, and a swollen out portion 36b swelling out from the central portion outwardly for insertion, said contacting portions 36a, 36b being formed by folding both end portions of a conductive spring material formed of a plain plate or a wiring material.

The swollen out portion 36b of the movable contact 36 is inserted into coupling grooves 27c, 27c formed in parallel with respect to each other in the elongated direction in the side face of said movable cover portion 27. Simultaneously, the pawl 26d1 formed substantially whole around the circumference at the tip end portion of the inner peripheral wall 26d of the base portion 26 is engaged with the inner periphery of the through hole 27b of the movable cover portion 27.

The leads 37 are soldered to the swollen out portions 36b of the movable contacts 36. The collected bundle of the leads 37 is fixed by a band member 27d provided on the outer face of the movable cover portion 27, and a connector 38 connected to the foremost end portion thereof.

Since the slip ring B which is accommodated in the inner bore 14b defined by the base 12 and locking disc 14 is constituted as in the same manner as the slip ring A, a duplicate description thereof will be avoided.

The connector 38 of the slip ring A within the pad base 19 is connected to the connector 38 of the slip ring B within the base 12 and stopper 14 by means of a harness 43 with connector. Also, the connector of the lead 39 which is connected to the switches and display on the steering pad 6 is connected to the connector 33 of the slip ring A contained within the pad base 19. Further, the connector of the lead 40, which is connected to the circuit of the vehicle body side, is connected to the connector 33 of the slip ring B contained within the base 12 and locking disc 14.

As described in the foregoing, since the inner bore 19d is opened up at the steering pad 6 side of the pad base 19, when the steering pad 6 is removed, the slip ring A is exposed. Therefore, the replacement and/or repair of the slip ring can be made only by removing the steering pad 6.

Likewise, the bore 14d is opened up toward the steering column 18. Therefore, the slip ring B contained in the inner bore 14d can be exposed for replacement and/or repair by loosening the nut 23 and removing the boss 3 from the steering shaft 1.

Alternatively, the slip ring B may be contained in the steering column 18 for obtaining the same purpose since it can be exposed by removing the boss 3 in the same manner as mentioned above.

Now, with the above constitution, when the steering wheel 2 is rotated, the boss 3 is also rotated to further rotate the steering shaft 1, thus enabling the turning operation of a vehicle. On the other hand, the base 12, locking disc 14 and pad base 19 are held stationary as mentioned above, thereby maintaining the steering pad 6 attached to the pad base 19 in a normal position.

However, when the slide pins 22 are tended to rotate together with the boss plate 2a due to abutment between the boss plate 2a and the slide pins 22, or due to scoring of the slide pins 22 with respect to the cam portion 21b of the cam plate 21, the base 12 and the locking base 14 are brought out of engagement with respect to each other as mentioned above. As a result, the pad base 19 becomes rotatable, thus enabling to prevent the locking of the boss plate 2a, or the steering wheel 2.

Since lead 40 connected to the circuit of the vehicle side penetrates through the base 12 which does not rotate even at that time, the lead 40 is not wound around or tangled. Therefore, even if the locking disc 14 and the pad base 19 are rotated, the smooth rotation of the steering wheel 2 will not be jeopardized, nor will the rotation of the locking disc 14 and the pad base 19 result in such troubles as cutting of the leads or the like.

Figure 11:
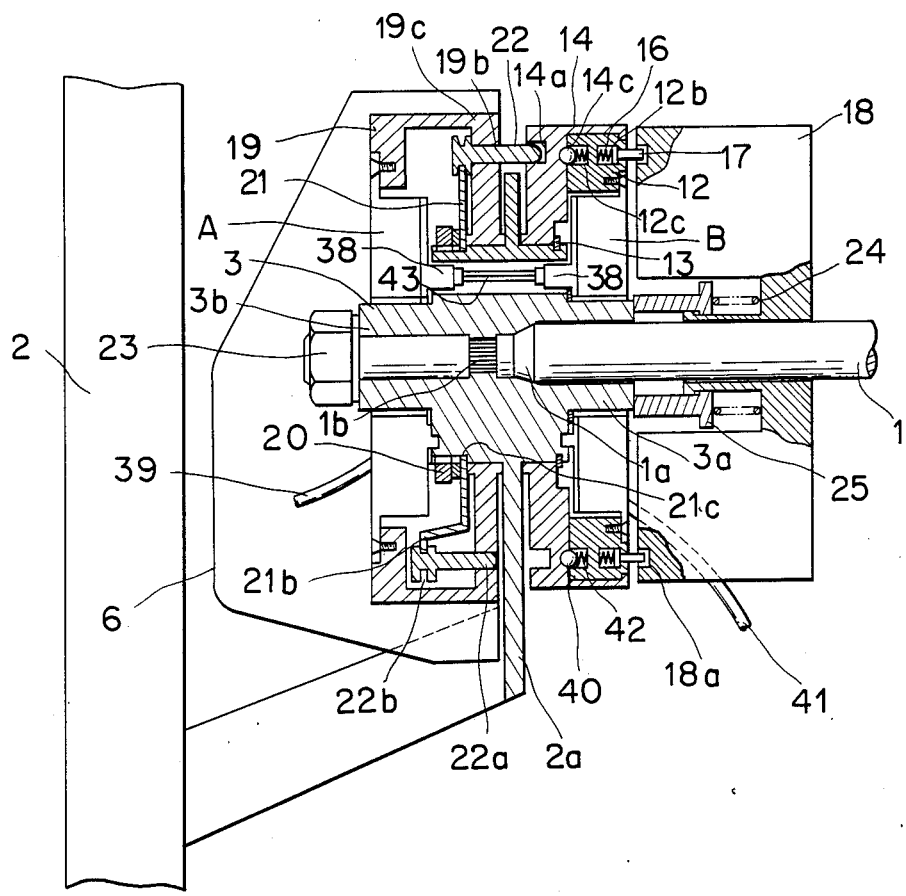
FIG. 11 is a sectional view of a second embodiment of the steering wheel apparatus according to the present invention.

A second preferred embodiment of the present invention will now be described with reference to FIG. 11, wherein the numerals which are identical with those in the first embodiment designate the identical parts.

Figure 2:
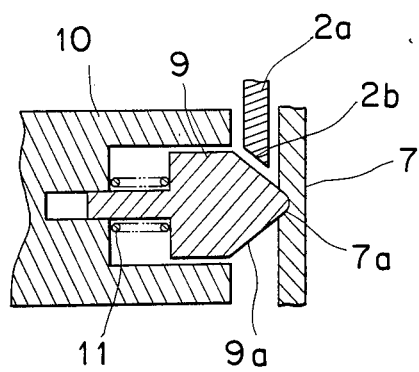
FIG. 2 is a cross sectional view of the above but showing only a portion which is material to the prior art apparatus.

Also, since the identical numerals with those in FIGS. 1 and 2 designate the identical parts, a duplicate description will be avoided.

A locking disc 14 is mounted on a front portion 3a of a boss 3 in such a manner as to be fixed with respect to the axial direction by a C-ring 13 but free with respect to the rotary direction. A base 12 is rotatably engaged with the locking disc 14 at the front portion.

The base 12 is formed with holder holes 12c in each of which a coupling ball 41 and a spring 42 are accommodated, said coupling balls 41 each being coupled to each of coupling recesses formed in the locking disc 14 by means of the biasing force of the spring 42.

The base 12 is also formed with a holder hole 12b, in which a spring 16 and a coupling pin 17 are accommodated. Said coupling pin 17 is biased in the backward direction by the spring 16 and rested at the tip portion in a coupling recess 18a of a steering column body 18 which contains therein a lever combination switch (not illustrated). Since the steering column body 18 is not rotated, neither is the base 12 even when the boss 3 is rotated.

Since the base 12 is not rotated and held in a stationary state by virtue of the coupling of the base 12 and the locking disc 14 at the coupling ball 41 and the coupling recess 14c, the locking disc 14 does not rotate either even when the boss 3 rotates. However, when the locking disc 14 is forced to rotate by an enormous force, the coupling ball 41 escapes from the coupling recess 14c, thereby allowing the locking disc 14 to become free. As a result, the locking disc 14 becomes rotatable.

Pad base 19 is mounted on the boss 3 in such a manner as to be fixed with respect to the axial direction but free in the rotary direction by a cam plate 21 which is secured to a front portion 3b of the boss 3 by a nut 20. Said pad base 19 comprises a thick portion 19c formed with a plurality of through holes 19b for allowing a plurality of slide pins 22 to penetrate therethrough. A steering pad 6 equipped with switches, display and the like is mounted on pad base 19.

Locking disc 14 is formed with a plurality of coupling recesses 14a opposite said through holes 19b. The chamfered portions 22a at the tips of the slide pins 22 penetrating through said through holes 19b rest in the coupling recesses 14a.

Also, the slide pins 22 are provided at the other end portions with tapered ring-shaped grooves 22b respectively. Said cam plate 21 is formed with a cam face 21b formed of a synthetic resin material and tapered 21a at the outer end portion. Said cam face 21b is fitted by the ring-shaped grooves 22b. Thus, the slide pins 22 are slided to and fro within the through holes 19b according to the configuration of the cam face 21b.

The cam face 21b is formed in such configuration as that at least one of the slide pins 22 are pushed in at the maximum extent, and after the adjacent slide pins 22 are pushed in at the maximum extent, they are retreated backwardly. When the slide pins 22 are pushed in at the maximum extent, the tip portions thereof are inserted into the coupling recesses 14a of the locking disc 14. The tip portions of the slide pins 22 are provided with the chamfered portions 22a, so that the tip portions will not hit the marginal portions of the coupling recesses 14a when they enter.

Furthermore, since the outer end portion of the cam face 21b is tapered 21a and the ring-shaped grooves 22b of the slide pins 22 are tapered, the contact between them for sliding the slide pins 22 will not constitute a point contact even at the slant portions of the cam face 21b thus obtaining a smooth movement. Moreover, since the cam face 21b is formed of a synthetic resin material, a sliding resistance between them is comparatively small. As a result, the smooth movement of the slide pins 22 is obtained and extraordinary wear between the cam face 21b and the slide pins 22 can be prevented.

The boss plate 2a of the steering, wheel 2 is fixedly attached to the boss 3, and an inner projection 21a of the cam plate 21 is inserted into its key groove and fixedly secured thereto by a nut 20. As a result, when the steering wheel 2 is rotated, the boss 3 is rotated to further rotate the cam plate 21.

However, since the tip portions of a part of the slide pins 22 are inserted into the coupling recesses 14a of the locking disc 14 which is not rotatable as mentioned above, the pad base 19 is not rotated. On the other hand, since a part of the slide pins 22 are withdrawn into the through holes 19b the boss plate 2a of the steering wheel 2 can be rotated therethrough.

A tapered portion 1a and a knurling tool portion 1b of the steering shaft 1 are meshed by the internal diameter of the boss 3, which is firmly fitted onto the steering shaft 1 and the boss 3 are integrated, the rotation of the steering wheel 2 is transmitted to the steering shaft 1.

Within the steering column body 18 containing a lever combination switch, a cancel cam 25 is mounted on the steering shaft by means of a spring 24 interposed therebetween. The cancel cam 25 is urged to engage with the boss 3 by the biasing force of the springs, so that when the steering wheel 2 is rotated, the cancel cam 25 is actuated to extinguish turn signal lamps.

In this way, since there are mounted on the boss 3 the base 12 which supports the locking disc 14, the pad base 19 and the cam plate 21, these mechanisms for rotating the steering pad 6 and the steering wheel 2 can be removed by loosening the nut 23.

Consequently, when assembled, after these mechanisms and the steering wheel 2 are mounted on the boss. 3, the boss 3 is fitted onto the steering shaft 1. Then, the base 12 is rotated to bring the coupling pins 17 in agreement with the coupling recesses 18a, and the pins 17 are urged to couple with the recesses 18a by means of the force of the springs 16, so that the base 12 is stopped rotating. Thereafter, the nut 23 is screwed tight to complete the assembly.

Furthermore, slip rings A and B are accommodated respectively in an inner bore 14b which is defined by the base 12 and the locking disc 14 and opened up toward the steering column body 18 side and in an inner bore 19d of the pad base 19 opened up toward the steering pad 6 side. Switches and display on the steering pad 6 are thus connected with the circuits of the vehicle body side.

Since these slip rings A and B are identical with those in the first embodiment, a duplicate description will be avoided.

A connector 38 of the slip ring A within the pad base 19 and another connector 38 of the slip ring B within the base 12 and the locking disc 14 are connected each other by a harness 43 with connector. The connector 33 of the slip ring A within the pad base 19 is connected by the connector of the lead 39 which is connected to the switches and display on the steering pad 6. Furthermore, the connector 33 of the slip ring B within the base 12 and the locking disc 14 is connected by the connector of a lead 40 which is connected to the circuit of the vehicle body side through the base 12.

In this second embodiment, since the operation of the steering wheel 2 during its rotation and when its rotation is prevented is the same at that described with respect to the first embodiment, a duplicate description will be avoided.

Figure 12:
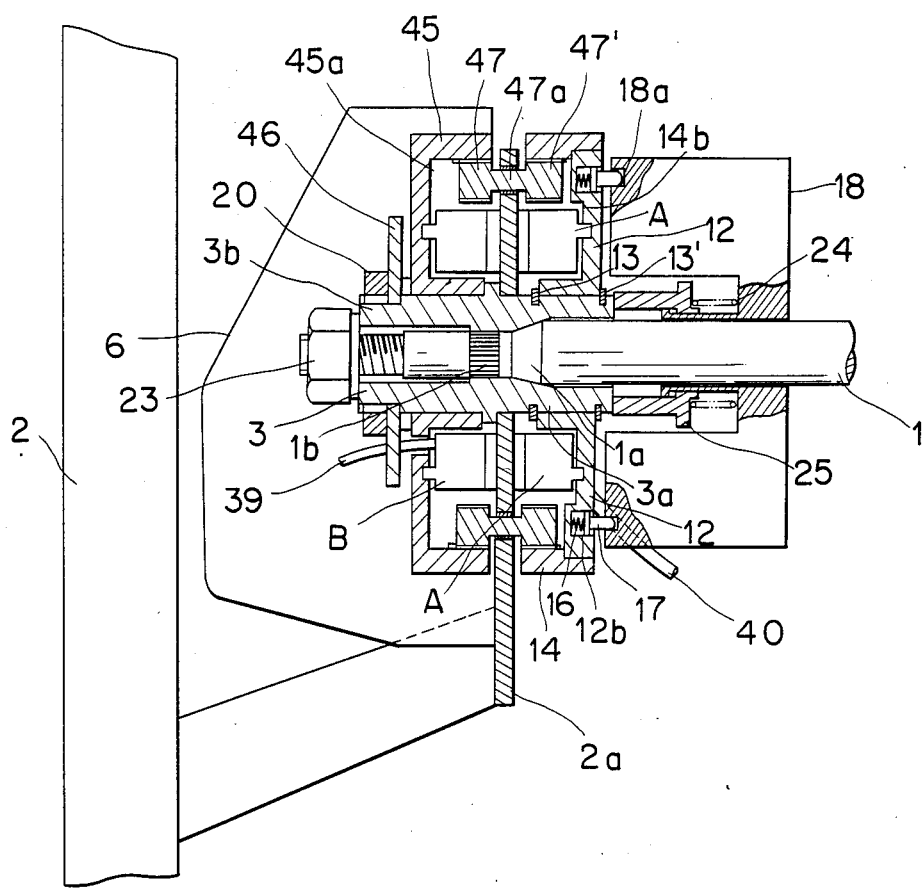
FIG. 12 is a sectional view of a third embodiment of the steering wheel apparatus according to the invention.

Referring now to FIG. 12, a third preferred embodiment of the present invention will be described, wherein since the numerals which are identical with those in FIGS. 1 and 2 represent identical parts, a duplicate description will be avoided.

12 denotes a base mounted on a rear portion 3a of a boss 3 in such a manner as to be fixed with respect to the axial direction but free with respect to the rotary direction by C-rings 13, 13'. A locking disc 14 is rotatably mounted on the outer periphery of said base 12.

Said locking disc 14 is formed with recesses 14a, in each of which a leaf spring 15 having at the both ends folded portions 15a for engagement is rested, said folded portions 15a engaging with a V-shaped cut 12a of the base 12.

Also, said base 12 is formed with holder holes 12b, in each of which a spring 16 and a coupling pin 17 are contained. Said coupling pin 17 is biased in the backward direction by the spring 16 and rested at the tip portion in a coupling recess 18s of a steering column body 18 which contains a lever combination siwtch (not illustrated) therein. Since the steering column body 18 is not rotated, neither is rotated the base 12 even when the boss 3 is rotated.

Since the base 12 is not rotated and held in a stationary state, the locking disc 14, which is engaged at the folded portions 15a of the leaf spring 15 with the V-shaped cuts 12a of the base 12, is not rotated either. However, when the locking disc 14 is forced to rotate, said folded portions 15a will be disengaged from the V-shaped cuts 12a by resisting the biasing force of the leaf spring 15. As a result, the locking disc 14 becomes rotatable.

45 denotes an inner gear mounted on the boss 3 in such a manner as to be fixed with respect to the axial direction but free in the rotary direction by a washer 46 which is threadedly secured to a front portion 3b of the boss 3 by a nut 20. An inner side gear is formed at the inner periphery of the rim portion. A steering pad 6 equipped with switches, display and the like is mounted on said inner gear 45.

On the other hand, the boss plate 2a of the steering wheel 2 is fixedly attached to the boss 3 and the boss 3 is rotated according to the rotation of the steering wheel 2. The boss 3 is made to carry the locking disc 14 and a shaft 47a of planetary gears 47, 47' meshed with the inner side gears of the inner gear 45 respectively and supported by the boss plate 2a so that the stationary state, i.e., the non-rotating state, is transmitted to the inner gear 45 by the planetary gears 47, 47' at the time when the steering wheel 2 is rotated. As a result, the inner gear 45 is held in a non-rotating state, i.e., a stationary state, thereby maintaining the steering pad 6 in a normal position.

A tapered portion 1a and a knurling tool portion 1b of the steering shaft 1 are meshed by the internal diameter of the boss 3, which is securely fastened to the steering shaft 1 by a nut 23. As a result, since the steering shaft 1 and the boss 3 are integrated, the rotation of the steering wheel 2 is transmitted to the steering shaft 1.

Within the steering column body 18 containing a lever combination switch, a cancel cam 25 is mounted on the steering shaft 1 with a spring 24 interposed therebetween. The cancel cam 25 is urged to engage with the boss 3 by the biasing force of the spring 24, so that when the steering wheel 2 rotates, the cancel cam 25 is actuated to extinguish turn signal lamp.

With the above structure in which the planetary gears 47 and 47' are supported by the boss plate 2a and meshed with the inner side gears of the pad base 45 and the base 14, the positional relationship of the pad base 45 and the base 14 will not change even during the operation of the steering wheel.

Consequently, when in assembly, after these mechanisms and the steering wheel 2 are mounted on the boss 3, the boss 3 is fitted onto the steering shaft 1. Then, the base 12 is rotated to bring the coupling pins 17 in agreement with the coupling recesses 18a, and the pin 17 are urged to enter into the recesses 18a for engagement by means of the force of the spring 16, so that the base 12 can be stopped rotating. Thereafter, the nut 23 is screwed tight to complete the assembly.

Furthermore, an inner bore 14b defined by the base 12 and the locking disc 14, and an inner bore 45a of the inner gear 45 are formed, with the boss plate 2a interposed therebetween. Within these inner bores 14b and 45a, slip rings A and B for connecting the switches, the display and the like on the steering pad 6 to the circuits of the vehicle body side are accommodated.

Since these slip rings A and B are identical with those described with respect to the first embodiment and also the function when the rotation is prevented is identical with that described with respect to the first embodiment, a duplicate description will be avoided.

Figure 13:
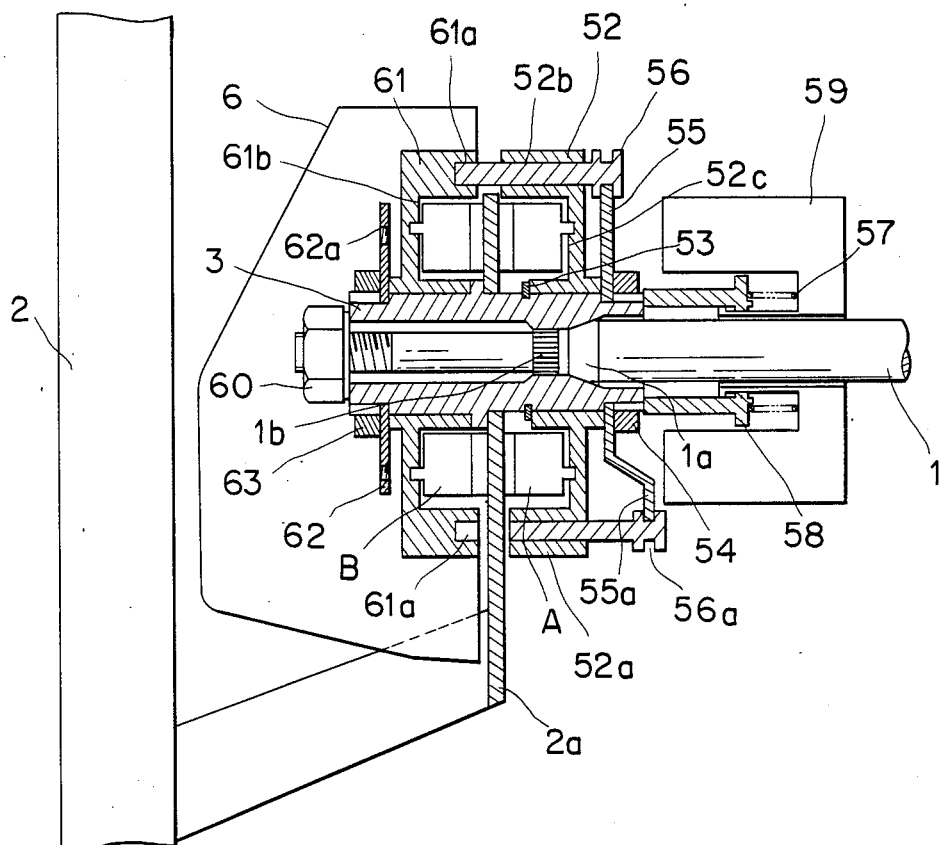
FIG. 13 is a sectional view of a fourth embodiment of the steering wheel apparatus according to the present invention.

Referring now to FIG. 13, a fourth embodiment of the steering wheel apparatus according to the present invention will be described.

52 denotes a pin holder mounted on a boss 3 in such a manner as to be fixed with respect to the axial direction but free in the rotary direction by a C0ring 53 and a nut 54 through a cam plate 55. The outer peripheral portion 52a of said pin holder 52 is formed in a thick form through which a plurality of through holes 52b are defined. A plurality of slide pins 56 are slidably penetrated into said through holes 52b in the axial direction.

The cam plate 55 is fixed to the boss 3 in the axial direction as well as the rotary direction by a suitable method, e.g., by inserting a key-shaped projection into a key groove formed in the boss 3.

A cam face 55a at the outer periphery of said cam plate 55 is inserted into a ring shaped groove 56a formed in said slide pin 56. A steering shaft 1 is penetrated into a steering column 59 which contains a spring 57 and a cancel cam 58 disposed on said steering shaft 1. A lever combination switch is also stored in the steering column 56 to which the pin holder 52 is connected by a suitable method so that the rotation of the pin holder 52 is prevented.

On the other hand, the boss 3 is firmly secured to a boss plate 2a of the steering wheel 2 and mounted on the steering shaft 1. The tapered portion 1a and the knurling tool 1b of the steering shaft 1 bite into the boss 3 as the nut 60 is fastened tight. As a result, since the boss 3 and the steering shaft 1 are integrated, when the steering wheel 2 is rotated, the steering shaft 1 is also rotated thus performing the steering operation.

When the steering wheel 2 is rotated, the boss 3 and the cam plate 55 are associated for rotation. However, the pin holder 52 is prevented from rotating and held in its stopped state. Therefore, the ring-shaped groove 56a of the slide pin 56 is pushed in the axial direction along the cam face 55a at the outer periphery of the cam plate 55. As a result, the slide pin 56 is slided in the axial direction through the through hole 52a of the pin holder 52.

61 denotes a stopper which is mounted on the boss 3 in such a manner as to be fixed with respect to the axial direction but free with respect to the rotary direction by a nut 63 through a washer 62. A steering pad 6 equipped with switches and display is mounted on said stopper 61.

Said stopper 61 is formed with the same number of coupling recesses 61a as that of slide pins 56 in positions opposite to the respective slide pins 56. When the tip portions of the slide pins 56 are pushed out from the pin holder 52 by the cam face 55a of the cam plate 55 as mentioned above, the tip portions of said slide pins 56 are caused to couple in the coupling recesses 61a. Since the stopper 61 and the pin holder 62 are associated in the rotary direction, the stopper 61 is also maintained in its stopped state.

It is preferable to chamfer either the tip portions of the slide pins 56 or the entrances of the coupling recesses 61a so that the coupling between the slide pins 56 and the coupling pins 61a can be made smoothly.

Also, the cam face 55a is formed in such a configuration as that at least one of the plurality of slide pins 56 are projected at the tip portions at the maximum extent, and after the adjacent slide pins 56 are projected at the maximum extent, they are retreated backwardly. Since at least one slide pins 56 are always coupled in the coupling recesses 61a, the stopper 61 is stopped rotating.

Since the boss plate 2a of the steering wheel 2 is designed to pass through the area where the slide pins 56 are withdrawn into the pin holders 52, the steering wheel 2 is rotatable. On the other hand, the steering pad 6 is not rotated and always held in its normal position so that switches provided thereon can be operated easily and display thereon can be looked easily.

Since the boss 3 and the cancel cam 58 are brought to be in a coupling state by the biasing force of the spring 57, the blinking turns signal light due to the lever combination switch is extinguished by the rotation of the cancel cam 58.

As described in the foregoing, there are mounted on the boss 3 the cam plate 55, pin holder 52, stopper 61 and boss plate 2a of the steering wheel 2 which are adapted for maintaining the steering pad 6 in its normal position, the boss 3 can be removed from the steering shaft 1 by loosening the nut 60, thus enabling to remove the steering wheel 2 and the other devices.

Therefore, even such devices as a lever combination switch which are positioned far inside can be replaced and/or repaired without much inconvenience.

However, the boss 3 and the steering shaft 1 are firmly secured at the tapered portion 1a of the steering shaft 1 and the knurling tool by virtue of the biting. If the steering wheel 2 is forced to be removed, it is likely to be deformed or otherwise damaged at other portions.

In order to prevent the above, the washer 62 is formed with tapped holes 62a for attaching a removing jig so that the boss 3 can be removed with ease.

Figure 14:
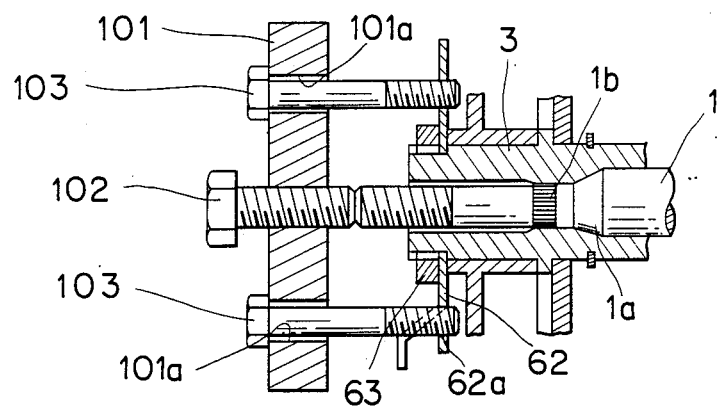
FIG. 14 is a sectional view of the jig for removal when in use in connection with the steering wheel apparatus according to the fourth embodiment of the present invention.

FIG. 14 illustrates the jig as already described with respect to the first embodiment applied to the fourth embodiment of the steering wheel apparatus of the present invention.

In order to remove the boss 3 with said jig, the jig main body 101 is mounted to the washer 62 in such a manner as that the screws 103 are screwed into corresponding holes 101a of the jig body 101 for further screwing into the tap holes 62a of the washer 62.

As a result, the center of the main screw 102 is brought to be in alignment with the center of the steering shaft. As the main screw 102 is tightened, the jig body 101 is pushed away in the departing direction with respect to the steering shaft 1, and the washer 62 is moved in the removing direction with respect to the axial direction. Since the washer 62 is fixedly secured to the boss 3 with the nut 63, the boss 3 can thus be removed.

Furthermore, inner bores 52c and 61b are defined within the pin holder 52 and the stopper 61 respectively with the boss plate interposed therebetween. Within said inner bores 52c and 61b, the slip rings A and B are contained in order to connect the switches and display on the steering pad 6 to the circuits at the vehicle body side.

Since these slip rings A and B are identical with those in the first embodiment, a duplicate description will be avoided.

Figure 15:
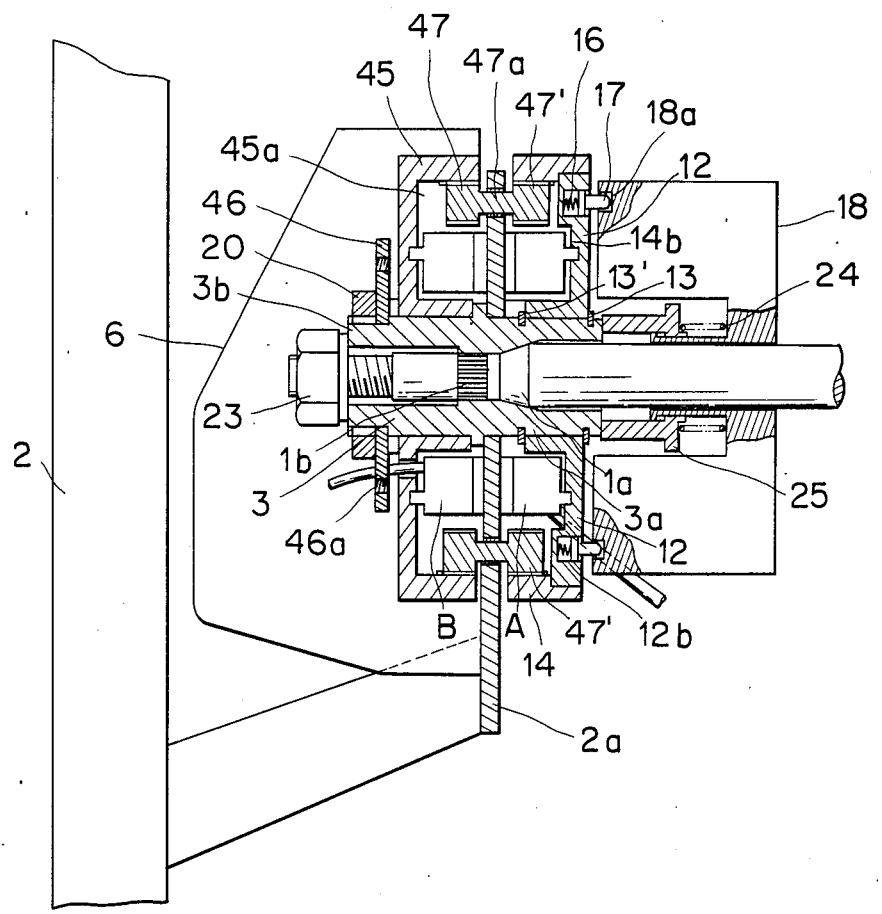
FIG. 15 is a sectional view of a fifth embodiment of the steering wheel apparatus according to the present invention.

Referring to FIG. 15, a fifth embodiment of the steering wheel apparatus will be described.

12 denotes a base mounted on a rear portion 3a of a boss 3 in such a manner as to be fixed with respect to the axial direction but free with respect to the rotary direction by C-rings 13, 13'. A locking disc 14 is rotatably mounted on the outer periphery of said base 12.

Said locking disc 14 is formed with recesses 14a, in each of which a leaf spring 15 having at the both ends folded portions 15a for engagement is rested, said folded portions 15a engaging with a V-shaped cut 12a of the base 12.

Also, said base 12 is formed with holder holes 12b, in each of which a spring 16 and a coupling pin 17 are contained. Said coupling pin 17 is biased in the backward direction by the spring 16 and rested at the tip portion in a coupling recess 18a of a steering column body 18 which contains a lever combination switch (not illustrated) therein. Since the steering column body 18 is not rotated, neither is rotated the base 12 even when the boss 3 is rotated.

Since the base 12 is not rotated and held in a stationary state, the locking disc 14, which is engaged at the folded portions 15a of the leaf spring 15 with the V-shaped cuts 12a of the base 12, is not rotated either. However, when the locking disc 14 is forced to rotate, said folded portions 15a will be disengaged from the V-shaped cuts 12a by resisting the biasing force of the leaf spring 15. As a result, the locking disc 14 becomes rotatable.

45 denotes an inner gear mounted on the boss 3 in such a manner as to be fixed with respect to the axial direction but free in the rotary direction by a washer 46 which is threadedly secured to a front portion 3b of the boss 3 by a nut 20. An inner side gear is formed at the inner periphery of the rim portion. A steering pad 6 equipped with switches, display and the like is mounted on said inner gear 45.

On the other hand, the boss plate 2a of the steering wheel 2 is fixedly attached to the boss 3 and the boss 3 is rotated according to the rotation of the steering wheel 2. The boss 3 is made to carry the locking disc 14 and a shaft 47a of planetary gears 47, 47' meshed with the inner side gears of the inner gear 45 respectively so that the stationary state, i.e., the non-rotating state, is transmitted to the inner gear 45 by the planetary gears 47, 47' at the time when the steering wheel 2 is rotated. As a result, the inner gear 45 is held in a non-rotating state, i.e., a stationary state, thereby maintaining the steering pad 6 in a normal position.

A tapered portion 1a and a knurling tool portion 1b of the steering shaft 1 are meshed by the internal diameter of the boss 3, which is securely fastened to the steering shaft, 1 by a nut 23. As a result, since the steering shaft 1 and the boss 3 are integrated, the rotation of the steering wheel 2 is transmitted to the steering shaft 1.

Within the steering column body 18 containing a lever combination switch, a cancel cam 25 is mounted on the steering shaft 1 with a spring 24 interposed therebetween. The cancel cam 25 is urged to engage with the boss 3 by the biasing force of the spring 24, so that when the steering wheel 2 rotates, the cancel cam 25 is actuated to extinguish turn signal lamps.

With the above structure in which the planetary gears 47 and 47' are supported by the boss plate 2a and meshed with the inner side gears of the pad base 45 and the base 14, the positional relationship of the pad base 45 and the base 14 will not change even during the operation of the steering wheel.

Consequently, when in assembly, after these mechanisms and the steering wheel 2 are mounted on the boss 3, the boss 3 is fitted onto the steering shaft 1. Then, the base 12 is rotated to bring the coupling pins 17 in agreement with the coupling recesses 18a, and the pins 17 are urged to enter into the recesses 18a for engagement by means of the force of the spring 16, so that the base 12 can be stopped rotating. Thereafter, the nut 23 is screwed tight to complete the assembly.

Furthermore, an inner bore 14b defined by the base 12 and the locking disc 14, and an inner bore 45a of the inner gear 45 are formed, with the boss plate 2a interposed therebetween. Within these inner bores 14b and 45a, slip rings A and B for connecting the switches, the display and the like on the steering pad 6 to the circuits of the vehicle body side are accommodated.

Furthermore, the washer 46 which is fastened tight by the nut 20 threadedly engaged with the boss 3 is also provided with tapped holes 46a for attaching the removing jig as in the same manner as described with respect to the first embodiment.

Since the jig for removing the boss 3 from the steering shaft 1 by utilizing these tapped holes 46a and the method of use thereof are identical with those already described with respect to the first embodiment, a duplicate description will be avoided.

Furthermore, the afore mentioned slip rings A and B are also identical with those as already described with respect to the first embodiment. Therefore, a duplicate description will be avoided.

Figure 16:
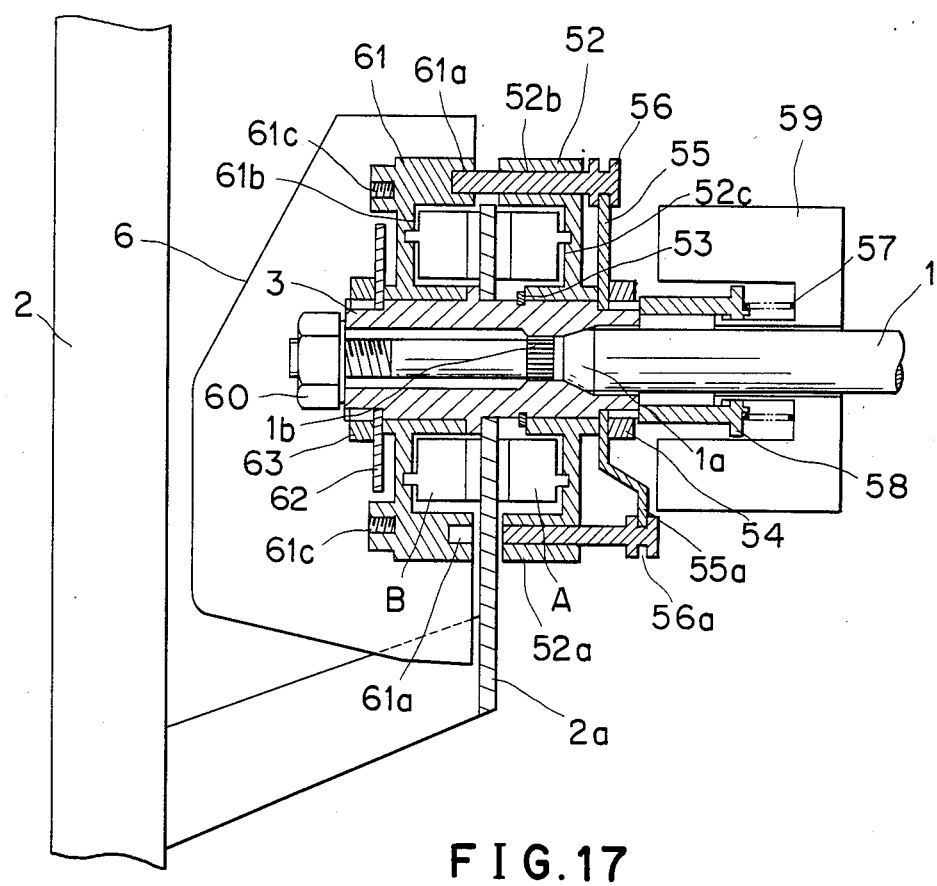
FIG. 16 is a sectional view of a sixth embodiment of the steering wheel apparatus according to the present invention.
Figure 17:
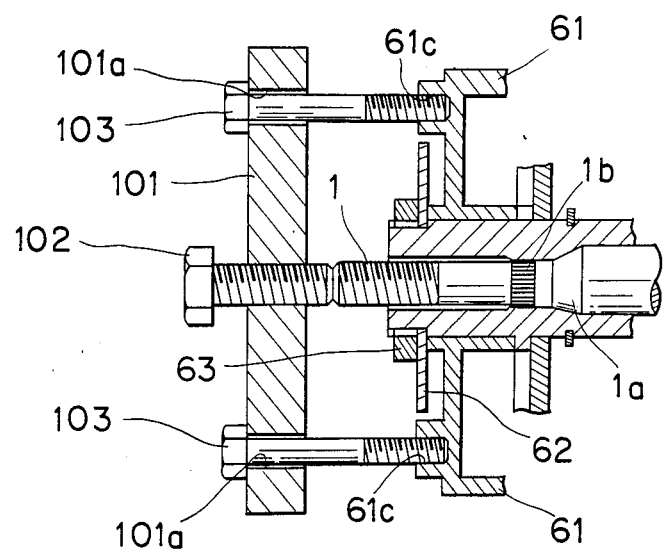
FIG. 17 is a sectional view of the jig for removal when in use in connection with the steering wheel apparatus according to the sixth embodiment of the present invention.
Figure 18:
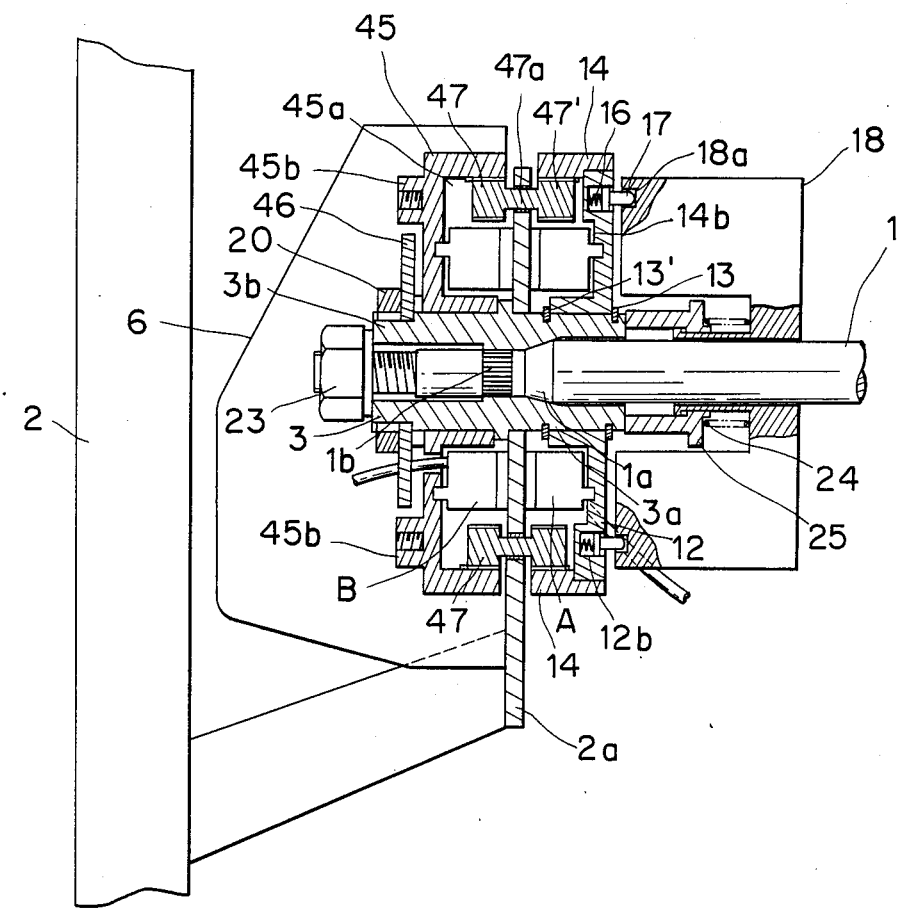
FIG. 18 is a sectional view of a seventh embodiment of the steering wheel apparatus according to the present invention.

Referring to FIGS. 16 and 17, a sixth embodiment of the steering wheel apparatus according to the present invention will be described.

52 denotes a pin holder mounted on a boss 3 in such a manner as to be fixed with respect to the axial direction but free in the rotary direction by a C-ring 53 and a nut 54 through a cam plate 55. The outer peripheral portion 52a of said pin holder 52 is formed in a thick form through which a plurality of through holes 52b are defined. A plurality of slide pins 56 are slidably penetrated into said through holes 52b in the axial direction.

The cam plate 55 is fixed to the boss 3 in the axial direction as well as the rotary direction by a suitable method, e.g., by inserting a key-shaped projection into a key groove formed in the boss 3.

A cam face 55a at the outer periphery of said cam plate 55 is inserted into a ring shaped groove 56a formed in said slide pin 56. A steering shaft 1 is penetrated into a steering column 59 which contains a spring 57 and a cancel cam 58 disposed on said steering shaft 1. A lever combination switch is also stored in the steering column 56 to which the pin holder 52 is connected by a suitable method so that the rotation of the pin holder 52 is prevented.

On the other hand, the boss 3 is firmly secured to a boss plate 2a of the steering wheel 2 and mounted on the steering shaft 1. The tapered portion 1a and the knurling tool 1b of the steering shaft 1 bite into the boss 3 as the nut 60 is fastened tight. As a result, since the boss 3 and the steering shaft 1 are integrated, when the steering wheel 2 is rotated, the steering shaft 1 is also rotated thus performing the steering operation.

When the steering wheel 2 is rotated, the boss 3 and the cam plate 55 are associated for rotation. However, the pin holder 52 is prevented from rotating and held in its stopped state. Therefore, the ring-shaped groove 56a of the slide pin 56 is pushed in the axial direction along the cam face 55a at the outer periphery of the cam plate 55. As a result, the slide pin 56 is slided in the axial direction through the through hole 52a of the pin holder 52.

61 denotes a stopper which is mounted on the boss 3 in such a manner as to be fixed with respect to the axial direction but free with respect to the rotary direction by a nut 63 through a washer 62. A steering pad 6 equipped with switches and display is mounted on said stopper 61.

Said stopper 61 is formed with the same number of coupling recesses 61a as that of slide pins 56 in positions opposite the respective slide pins 56. When the tip portions of the slide pins 56 are pushed out from the pin holder 52 by the cam face 55a of the cam plate 55 as mentioned above, the tip portions of said slide pins 56 are caused to couple in the coupling recesses 61a. Since the stopper 61 and the pin holder 62 are associated in the rotary direction, the stopper 61 is also maintained in its stopped state.

It is preferable to chamfer either the tip portions of the slide pins 56 or the entrances of the coupling recesses 61a so that the coupling between the slide pins 56 and the coupling recesses 61a can be made smoothly.

Also, the cam face 55a is formed in such a configuration as that at least one of the plurality of slide pins 56 are projected at the tip portions at the maximum extent, and after the adjacent slide pins 56 are projected at the maximum extent, they are retreated backwardly. Since at least one slide pins 56 are always coupled in the coupling recesses 61a, the stopper 61 is stopped rotating.

Since the boss plate 2a of the steering wheel 2 is designed to pass through the area where the slide pins 56 are withdrawn into the pin holders 52, the steering wheel 2 is rotatable. On the other hand, the steering pad 6 is not rotated and always held in its normal position so that switches provided thereon can be operated easily and display thereon can be looked easily.

Since the boss 3 and the cancel cam 58 are brought to be in a coupling state by the biasing force of the spring 57, the blinking turn signal light due to the lever combination switch is extinguished by the rotation of the cancel cam 58.

As described in the foregoing, there are mounted on the boss 3 the cam plate 55, pin holder 52, stopper 61 and boss plate 2a of the steering wheel 2 which are adapted for maintaining the steering pad 6 in its normal position, the boss 3 can be removed from the steering shaft 1 by loosening the nut 60, thus enabling to remove the steering wheel 2 and the other devices.

Therefore, even such devices as a lever combination switch which are positioned far inside can be replaced and/or repaired without much inconvenience.

However, the boss 3 and the steering shaft 1 are firmly secured at the tapered portion 1a of the steering shaft 1 and the knurling tool by virtue of the biting. If the steering wheel 2 is forced to be removed, it is likely to be deformed or otherwise damaged at other portions.

In order to prevent the above, the stopper 61 is formed with tapped holes 61c for attaching a removing jig so that the boss 3 can be removed with ease.

mechanism to rotate together with the steering wheel. Since there is no worry about the nonrotation of the steering wheel, a serious accident due to inability of driving of a car can be prevented.

Furthermore, since such conductive material as an electric with connected to the fixed contact of the slip rings which are connected to the switches, display and the like on the steering pad are made to penetrate through members at the column side of the afore-mentioned connecting mechanism, even when the power transmitting member should be rotated together with the steering wheel as mentioned before, such troubles of the electric wires as cutting due to winding or twisting with respect to the steering shaft or others can be prevented.

Furthermore, since there are provided on the boss, a steering wheel, a power transmitting mechanism adapted to hold the steering pad in a stationary state including a base, stopper, pin holder, cam plate, slide pins, and slip rings adapted to connect the circuit to the switches, display and the like on the steering pad, these components can be mounted on the boss in a sub-process in advance. Consequently, these components can be mounted to the steering shaft rapidly and with ease.

Furthermore, since the mounting operation can be carried out in a sub-process as mentioned above, the mounting accuracy and good performance are available with ease and surely.

Furthermore, when the lever combination switch is required to be repaired or replaced, since the steering shaft, power transmitting mechanism and slip rings can be removed only by removing the boss from the steering shaft, the repairing and replacing operation can be carried out effectively in a short time. Moreover, since it is not required to dismantle the power transmitting mechanism and slip rings, the accuracy and good performance thereof can be maintained which prove to be advantageous for maintenance extensively.

Furthermore, according to the present invention, the conductive member for transmitting the circuit signal to the switches and display on the steering pad is designed in such a manner as to be exposed on the face at the steering wheel side of the power transmitting mechanism comprising a base, stopper, pin holder, slide pins, cam plate and the like. Consequently, the conductive member can be seen only by removing the steering pad, thus facilitating an easy repairing and replacing operation.

Since the other conductive member is positioned either in the power transmitting mechanism or the steering column body in such a manner as to face toward the opposite face of the steering column body with respect to the power transmitting mechanism, it can be exposed by removing the whole power transmitting mechanism, thus facilitating an easy repairing and replacing operation.

Furthermore, since the base as a column connecting member of the power transmitting mechanism and the steering column body as a steering column side member are provided with coupling pins biased by springs and coupling recesses for coupling each other, the power transmitting mechanism for maintaining the steering pad in its normal position can be mounted in advance separately from the column side members.

Because of the foregoing, the power transmitting mechanism can be mounted to the steering shaft rapidly. At the same time, if a correct positional relation between the connecting member and the steering pad at the time when the power transmitting mechanism is mounted is maintained, the steering pad is automatically mounted to the normal position by virtue of the coupling of the coupling pins and the coupling recesses.

Furthermore, when the coupling pins and the corresponding coupling recesses are not in alignment, the coupling pins are withdrawn by resisting the biasing force of the springs. As a result, since the connecting member is brought to be freely rotatable with respect to the column side member, the transmitting mechanism will not be caused to be damaged and will not become out of order.

When the steering pad is brought to be in its normal position by the springs according to the rotation of the connecting member, the coupling pins are caused to couple in the coupling recesses. Therefore, a great deal of care is not required at the time when the mounting is carried out compared with the prior art apparatus.

As mentioned in the foregoing, according to the present invention, the steering pad is always maintained in its normal position without rotation. However, it is a usual practice to install the lever combination switch and cancel cam in positions far inside than the boss plate of the steering wheel. Therefore, it is required to remove the power transmitting mechanisms for maintaining the steering pad in its normal position and the steering wheel when these are to be repaired or replaced. In the present invention, since the power transmitting mechanism and the steering wheel are mounted on the boss, these mechanisms can be removed without dismantling only by removing the boss from the steering shaft.

When the boss is removed, a removing jig can be attached to the washer or the cam plate for easy removal. Therefore, there will not occur such trouble as bending the steering wheel or damaging other portions which often occurred in connection with the prior art apparatus where the removal is made by pulling the steering wheel.

Furthermore, since the washer is also served to mount the power transmitting mechanism to the boss, the number of parts can be reduced.

What is claimed is:

1. A steering wheel apparatus comprising:
    a steering column (18) fixed to a car body;
    a steering shaft (1) inserted into said steering column axially rotatably therein and having a rear portion projecting out of said steering column (18);
    a steering wheel (2) having an elongated boss (3) fixed to said steering shaft at said rear portion of the steering shaft (1), said elongated hoss having a front portion (3a) and a rear portion (3b) and nut means mounted to the rear portion of the steering shaft for securing the elongated boss thereto;
    base means for engagement with said steering column (18) to prevent a rotary motion thereof;
    first fixing means (13,13',53,54) for fixing said base means to said elongated boss to prevent the base means from moving in an axial direction;
    a pad base (19,45,61) rotatably supported around said rear portion (3b) of the elongated boss;
    second fixing means (20,63) mounted on said elongated boss for fixing said pad base to said elongated boss to prevent said pad base from moving rearwardly in an axial direction relative to said elongated boss, said second fixing means being removable from the base without removing said nut means;

a boss plate (2a) fixed to said steering wheel (2) and said elongated boss (3) and extending between said base means and said pad base (19); and rotation control means for normally preventing said paid base (19) from rotating relative to said base (12) means without interference with said boss plate (2a).

2. A steering wheel apparatus according to claim 1, wherein said rotation control means includes a cam plate (21) fixed by said second fixing means (20) to said elongated boss therearound on a rear side of the pad base (19), said cam plate having a cam face (21b) at a periphery thereof;

a plurality of through holes (19b) formed in said pad base (19) longitudinally radially; and a plurality of slide pins (22) extending through said through holes (19b) and having cam follower portions at rear ends thereof, said cam follower portions being in engagement with the respective cam faces (21b): whereas said base means includes a base (12) supported around said front portion (3a) of the elongated boss (3);

a locking disc (14) provided around said base (12) and having a plurality of coupling recesses (14a) formed therein in radial alignment with respective through holes (19b), said slide pins (22) having engaging portions at a front end thereof; and means for provisionally coupling said base (12) and said locking disc (14);

said cam plate having a first portion extending in a forward plane and a second portion extending in a rearward plane, said second portion aligning with said boss plate (2a) when viewed longitudinally such that slide pins (22) engaged with said second portion are retracted out of corresponding recesses (14a) and into corresponding through holes (19b) to avoid interference with said boss plate (2a).

3. A steering wheel apparatus according to claim 2, wherein said provisional coupling means includes at least a pair of V-shaped cuts (2a) formed in said base (12a) at a periphery thereof;

a recess (14a) formed in said locking disc at an inner periphery thereof circumferentially between said pair of V-shaped cuts; and a leaf spring rested within said recess and having both ends thereof (15a) folded to be engaged with said V-shaped cuts.

4. A steering wheel apparatus according to claim 2, wherein said base (12) and said locking disc (14) have respective axial end faces contacting each other, said provisional coupling means including holder holes formed in said axial end faces of the base;

springs accommodated in said holder holes and coupling balls (40) provided in contact with said spring in said holder holes; and coupling recesses (14c) formed in said axial end faces of the locking disc (14) in correspondence with said holder holes (12b) to receive said coupling balls therein.

5. A steering wheel apparatus according to claim 2, wherein said pad base (19) defines a first space whereas said base (12) and said locking disc (14) cooperate to define a second annular space, said steering wheel apparatus further including first slip ring means (A) accommodated within said first annular space; and second slip ring means (B) accomodated within said second annular space;

rotable connecting means for connecting said first and second slip ring means, said rotatable connecting means being rotatable together with said boss plate (2a).

6. A steering wheen apparatus according to claim 1, wherein said base (12) and said steering column (18) have respective coupling axial end surfaces facing each other, said coupling axial end surface of the base (12) having holder holes (12b), each holder hole accommodating a spring (16) and a coupling pin (17), said coupling axial end surface of the steering column (18) having coupling recesses (18a) arranged in correspondence with said holder holes (12b) to receive said coupling pin (17) therein.

7. A steering wheel apparatus according to claim 1, wherein said pad base is formed with a plurality of tapped holes formed in a rear axial end surface thereof, said tapped holes being provided in a circular arrangement around the elongated boss.

8. A steering wheel apparatus according to claim 1, wherein said apparatus further includes a washer provided between said pad base and the second fixing means, said washer being formed with a plurality of tapped holes in a rear side surface thereof in a circular arrangement around the elongated boss.

9. A steering wheel apparatus according to claim 2, wherein said cam plate (21) has a plurality of tapped holes formed therein in a circular arrangement around the elongated boss.

10. A steering wheel apparatus according to claim 1, wherein said rotation control means includes a first annular portion provided in said pad base (45), said first annular portion being formed with first gear teeth in an inner periphery thereof;

a second annular portion provided in said base means, said second annular portion being formed with second gear teeth in a inner periphery thereof;

first planet gears fixedly carried on said boss plate, said first planet gears being in mesh with said first gear teeth; and second planet gears fixedly carried on said boss plate, said second planet gears being in mesh with said second gear teeth.

11. A steering wheel apparatus according to claim 10, wherein each of said first planet gears and each of said second planet gears being connected with each other.

12. A steering wheel apparatus according to claim 1, wherein said rotation control means includes a cam plate (55) fixed by said first fixing means (54) to said elongated boss therearound on a forward side of the base means (52), said cam plate having a cam face (55a) at a periphery thereof;

a plurality of through holes (52b) formed in said base means longitudinally radially;

a plurality of slide pins (56) extending through said through holes (52b) and having cam follower portions (56a) at forward ends thereof, said cam follower portions being in engagement with the respective cam faces (55a); and a plurality of coupling recesses (61a) formed in said pad base (61) in radial alignment with the respective through holes (52b), said slide pins having engaging portions at rear ends thereof; and said cam plate (55a) having a first portion extending in a rearward plane and a second portion extending in a forward plane, said second portion aligning with said boss plate (2a) when viewed longitudinally such that slide pins (22) engaged with said second portion are retracted out of corresponding recesses (61a) and into corresponding through holes (52b) to avoid interference with said boss plate (2a).

* * * * *